United States Patent [19]

Eichfeld et al.

[11] Patent Number: 5,727,126
[45] Date of Patent: Mar. 10, 1998

[54] SELF-PROGRAMMING CIRCUIT

[75] Inventors: Herbert Eichfeld; Reiner Lederle, both of Munich, Germany

[73] Assignee: Siemens Aktiengesellschaft, Munich, Germany

[21] Appl. No.: 702,518

[22] PCT Filed: Feb. 8, 1995

[86] PCT No.: PCT/DE95/00161

§ 371 Date: Aug. 27, 1996

§ 102(e) Date: Aug. 27, 1996

[87] PCT Pub. No.: WO95/23360

PCT Pub. Date: Aug. 31, 1995

[30] Foreign Application Priority Data

Feb. 28, 1994 [DE] Germany ............... 44 06 498.5

[51] Int. Cl.⁶ .................................................. G06G 7/00
[52] U.S. Cl. .............................. 395/3; 395/51; 395/61; 364/148
[58] Field of Search ................... 395/3, 900, 61, 395/50, 51, 75; 364/148

[56] References Cited

U.S. PATENT DOCUMENTS 5,229,946   7/1993   Ghaem ..................... 364/431.05
5,259,063  11/1993   Salazar ........................... 395/3

Primary Examiner—Tariq R. Hafiz
Assistant Examiner—Jason W. Rhodes
Attorney, Agent, or Firm—Hill, Steadman & Simpson

[57] ABSTRACT

Circuit (SPSA) has a processing unit (VE) with an electrically erasable and electrically programmable read-only memory (EEPROM), a classification unit (KE) and an interface unit (EIF) for the read-only memory. The processing unit (VE) reads out from the read-only memory (EEPROM) instructions and/or data which have been automatically programmed in by a classification unit (KE) and an interface unit (EIF), as a function of input values (E) and/or internal values (ED, S) and/or output values (A) of the processing unit (VE). The processing unit may in this case take the form of a fuzzy controller or else a customary microprocessor. The advantage achieved hereby is, in particular, that the arrangement automatically adapts itself to the variance in structure (type diversity) and variance in time (ageing, wear) of a product and consequently the circuit has a wider range of applications and can be used optimally for a longer period of time.

2 Claims, 1 Drawing Sheet

SELF-PROGRAMMING CIRCUIT

BACKGROUND OF THE INVENTION

To ensure the best possible operating behavior of an overall system, it is advisable for a respective circuit belonging to the overall system to be matched to the rest of the overall system. If the rest of the overall system then changes, for example due to ageing, wear or else because the rest of the overall system has characteristics which differ on account of a varied range of types, operating behavior is generally no longer at an optimum.

U.S. Pat. No. 5,259,063 discloses a self-programming circuit in which a processing unit with an electrically erasable and electrically programmable read-only memory (EEPROM), a classification unit in the form of a central processor and an interface unit are provided, the processing unit reading out processing information from the read-only memory, in which circuit input values and/or internal values are processed in the classification unit to give classification results, the input values of the circuit also representing input values of the self-programming processing unit, and in which circuit an interface unit is provided in such a way that from one of the classification results there is generated at least one EEPROM address and at least one EEPROM datum (ED) and the read-only memory (EEPROM) is programmed therewith.

Furthermore, German Offenlegungsschrift 39 11 186 A1 discloses an independent classification unit in the form of a fuzzy assessment device, to which the input and output values of the self-setting circuit 1 are fed in the form of a difference, and which determines from the classification results new control constants on the basis of fuzzy rules, provided that an external enabling signal is present.

Furthermore, the journal Elektronik 4/1986, pages 79 to 83, discloses a controller which adapts itself to the ageing of its connected hardware by automatic reprogramming and in which a programmable memory with a processing unit is integrated on a chip.

SUMMARY OF THE INVENTION

The object on which the invention is based is thus that of specifying a circuit which is able to detect the above-mentioned changes, assess them and change its characteristics correspondingly in order to adapt itself better to the changed external circumstances and, as a result, achieve more optimum control properties or faster processing.

In general terms the present invention is a self-programming circuit. The circuit has a processing unit with an electrically erasable and electrically programmable read-only memory (EEPROM), a classification unit and an interface unit. The processing unit reads out processing information from the read-only memory. Input values and/or internal values and/or output values of the processing unit are processed in the classification unit to produce classification results. The input values and/or the output values of the processing unit also represent corresponding values of the self-programming circuit. An interface unit is provided such that from one of the classification results there is generated at least one EEPROM address and at least one EEPROM datum and the read-only memory (EEPROM) is programmed therewith, if an external enabling signal is present. The processing unit has a fuzzy controller with a knowledge base memory that contains the read-only memory (EEPROM). The classification unit forms the classification results from the input values and/or internal values and/or output values on the basis of a linguistic protocol, as in the case of fuzzy controllers, using IF-THEN rules. The input values are assigned to linguistic values of the respective input variables. The linguistic values of the input variables are logically combined with the linguistic values of the output variables, using the linguistic protocol. The linguistic values of an output variable are assigned to the classification results. The read-only memory (EEPROM) is programmed such that, using an EEPROM address, one of at least two alternative association functions is selected for the input variable and/or the output variable.

A major advantage of the invention is that the entire self-programming circuit according to the invention can be monolithically integrated in a simple way on account of the relatively modest additional circuitry and that the circuit comprises only a single element with very few external connections.

Advantageous developments of the present invention are as follows.

The read-only memory (EEPROM) is programmed such that, using an EEPROM address, one of at least two alternative offset values is selected for the input value and/or for the output value.

The read-only memory (EEPROM) is programmed such that, using an EEPROM address, one of at least two alternative sets of rules is selected and/or for at least one rule a weighting is selected from at least two alternative weightings and/or the number of rules of a respective set of rules is fixed.

The read-only memory (EEPROM) is programmed such that, using an EEPROM address, one of at least two alternative rule evaluation methods and/or one of at least two alternative inference methods and/or one of at least two alternative defuzzification methods is selected.

In an alternative embodiment of the processing unit a microprocessor whose program memory contains the read-only memory (EEPROM). If during processing there occurs a case distinction by ranges for the input values and if the values within the ranges are processed by programming parts lasting various lengths of time, the classification unit determines the frequency of the occurrence of the ranges of the input values. The classification unit reprograms the read-only memory such that the sequence of the case distinctions is carried out in accordance with the frequency of the occurrence of the associated ranges, the case distinction belonging to the range having the greatest frequency taking place first.

The processing unit with the electrically erasable and electrically programmable read-only memory (EEPROM), the classification unit and the interface unit are monolithically integrated on a semiconductor chip.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
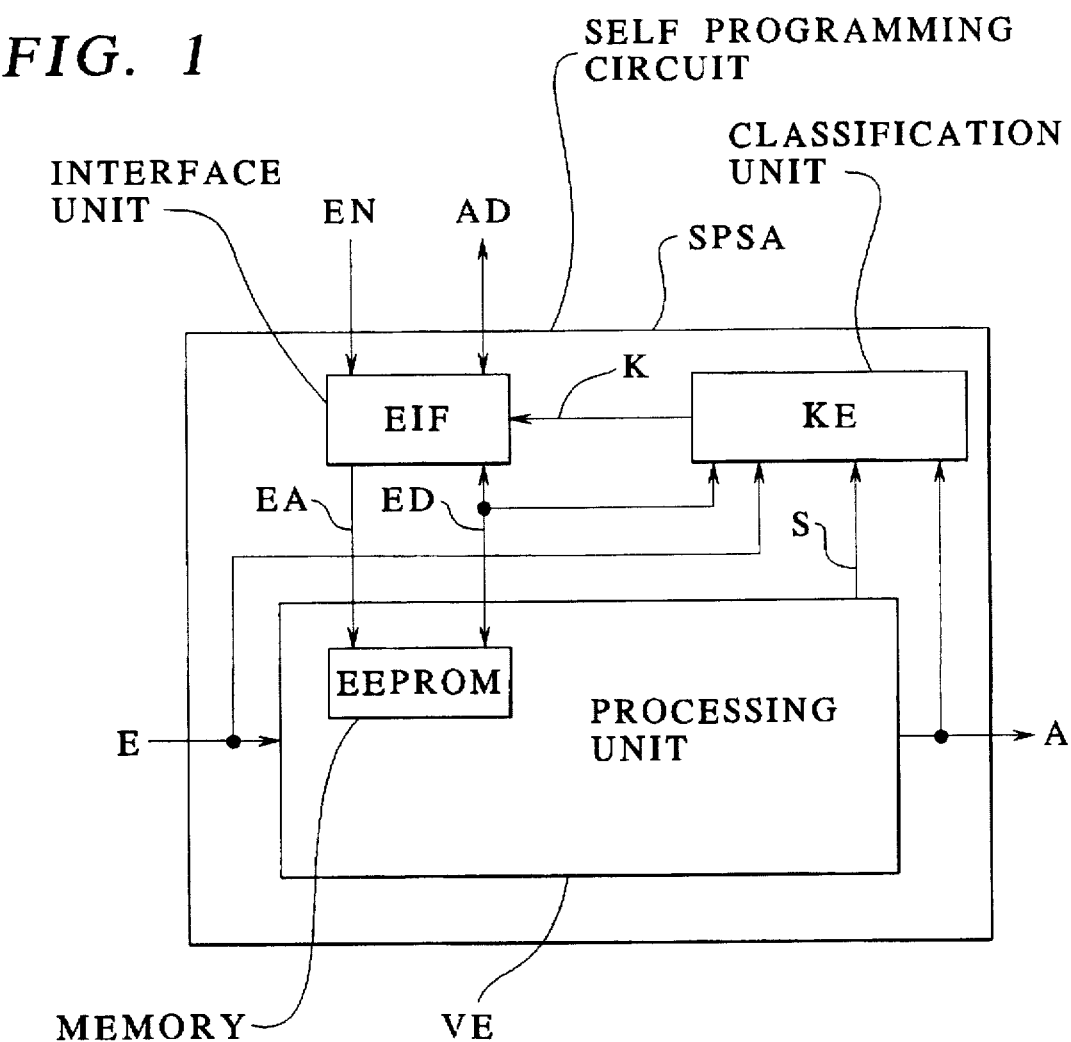
FIG. 1 shows a block diagram of a self-programming circuit according to the invention and FIG. 2 shows a block diagram of part of a preferred development of the self-programming circuit according to the invention.

In FIG. 1 there is shown a block diagram of a selfprogramming circuit SPSA according to the invention, in which a processing unit VE with an electrically erasable programmable read-only memory EEPROM, a classification unit KE and an interface unit (EEPROM interface) EIF are provided. The complete circuit according to the invention is in this case preferably monolithically integrated on a common semiconductor chip and has only external inputs for an enabling signal (enable) EN, an address/data bus AD, input values E and output values A of the processing unit VE.

The input values E and/or internal values ED, S and/or the output values A are fed to the classification unit KE and are processed there to give a classification result K, which for its part is fed to the interface unit EIF. The classification unit KE decides whether an EEPROM datum is to be changed or not and, if appropriate, in which way this has to take place. The classification unit KE is preferably designed like a fuzzy controller, the classification strategy being formulated in the form of IF-THEN rules and being stored in a knowledge memory of the classification unit. The knowledge memory of the classification unit KE is in this case likewise monolithically integrated on the semiconductor chip of the self-programming circuit.

The IF-THEN rules are typically of the form IF (E=WE) AND (ED=WED) AND (S=WS) AND (A=WA) THEN (K=WK), WX representing the linguistic value of the variables X. The values WX are in this case stored in a read-only memory (ROM), but there is also the possibility of giving the knowledge memory likewise the form of an electrically erasable and programmable read-only memory (EEPROM) and of providing a further, higher-order classification unit, which changes the knowledge base of the lower-order classification unit. This principle can, fundamentally, be generalized to apply to any number of hierarchial levels.

Since in many cases it is adequate that for each class, that is to say for each different value which K can assume, there is respectively provided only a single rule, classification units of a relatively simple construction with hard-wired IF-THEN rules are also conceivable.

The processing unit VE takes the form of, for example, a fuzzy controller, but may also take the form of other microelectronic systems, for example a microprocessor or microcontroller. What is essential here is that the processing unit permits reading out of the read-only memory EEPROM and in this way access to the part of the processing information programmed by the circuit SPSA itself is possible and that the variables E, A and S are in digital form. If the latter is not the case, a corresponding A/D conversion is additionally required.

Figure 2:
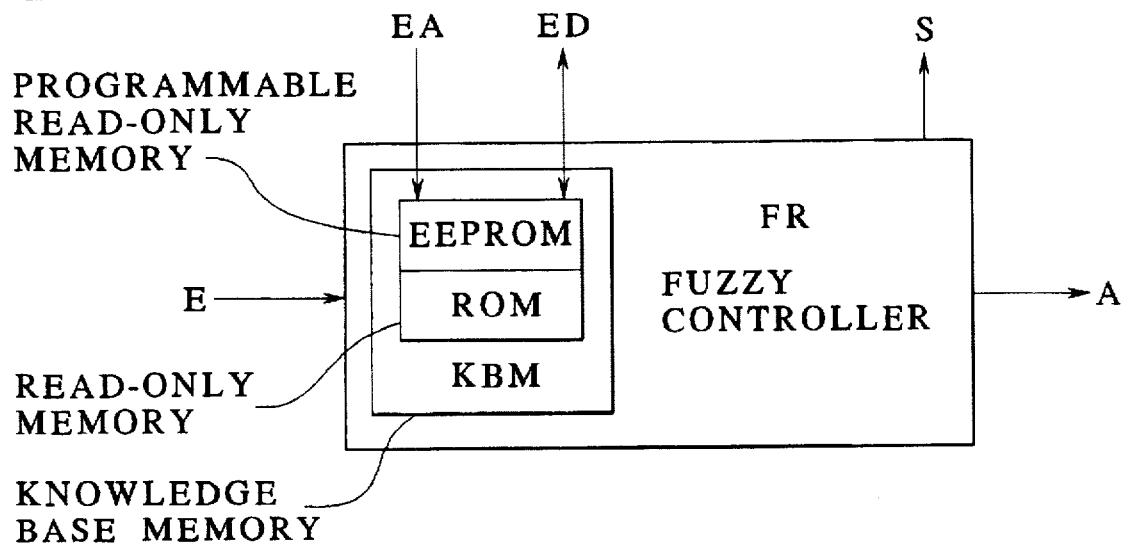

In FIG. 2 there is shown a block diagram of a processing unit VE in the form of a fuzzy controller FR, which contains a knowledge base memory KBM, which for its part has a read-only memory ROM and the read-only memory EEPROM. Here, the inputs E are the system deviations, the outputs A are the manipulated variables which act on a controlled system.

By reprogramming the read-only memory EEPROM, the following can be effected in this case, for example initiated by slow changes in the controlled system, such as for example ageing or wear: 1. A renewed fixing of one of at least two alternative offset values for the input value (E) and/or for the output value (A) by the EEPROM address EA.

2. A renewed fixing of one of at least two alternative offset values, which is added to a start address for association addresses, in order to shift the functional spectrum to the left or to the right, by an EEPROM address EA, this of course presupposing that the memory areas newly addressed in this way are occupied by a corresponding addition to the functional spectrum.

3. A renewed fixing of the number of rules, in order to include new rules which although already stored are not in the address space, or to remove existing rules from the address space.

4. A renewed fixing of the weighting of at least one rule by an EEPROM address EA.

Furthermore, by reprogramming the read-only memory EEPROM, the following can be effected, for example initiated by sudden changes in the controlled system:

1. A renewed fixing of one of at least two alternative rule evaluation methods and/or one of at least two alternative inference methods and/or one of at least two alternative defuzzification methods by an EEPROM address EA.

2. A renewed fixing of a set of rules, for example for a new product type or for special "emergency rules" in the case of extreme operating states, such as for example in cases where the controlled system is damaged, by an EEPROM address as the start address.

3. A renewed fixing of input or output association functions by an EEPROM address as the start address.

The above-mentioned fixing operations may occur individually or else in combination. How many EEPROM addresses are required for this in an individual case depends, for example, on the word length of the EEPROM addresses and on the type of coding of the above-mentioned fixing operations.

The internal values S can in this case supply to the classification unit information on whether a rule of a set of rules has been affected, or weightings of rules in some form or other.

Instead of a controller, a microprocessor whose program memory contains the read-only memory EEPROM can be used as the processing unit (VE). Stored in the read-only memory EEPROM are instructions, which the classification KE replaces, for example, by instructions which shorten the run time of a program.

If, for example, there takes place in the processing a case distinction by ranges for the input values (E), the input values occurring with varying frequency, and if the values within the ranges are processed by program parts lasting various lengths of time, the classification unit (KE) may, for example, be designed in such a way that it determines the frequency of the occurrence of the ranges of the input values (E) and reprograms the read-only memory in such a way that the sequence of the case distinctions is carried out in accordance with the frequency of the occurrence of the associated ranges, the case distinction belonging to the range having the greatest frequency taking place first.

In connection with the type diversity mentioned, to be brought to mind in particular are the various versions of automobile parts, the respective version of which is automatically identified by the fuzzy controller according to the invention.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed:

1. A self-programming circuit, comprising:

a processing unit having an electrically erasable and electrically programmable read-only memory, the processing unit connected to a classification unit and an interface unit, the processing unit reading out processing information from the read-only memory;

the classification unit processing at least one of input values, internal values, and output values of the processing unit to produce classification results, the input values and/or the output values of the processing unit also representing corresponding values of the self-programming circuit;

an interface unit that effects generating from one of the classification results at least one EEPROM address and at least one EEPROM datum, the read-only memory being programmed therewith, if an external enabling signal is present; and the classification unit forming the classification results from at least one of the input values, the internal values and the output values based on a linguistic protocol, which for fuzzy controller uses IF-THEN rules, the input values being assigned to linguistic values of the respective input variables, the linguistic values of the input variables being logically combined with linguistic values of the output variables, using the linguistic protocol, and linguistic values of an output variable being assigned to the classification results, the processing unit being a microprocessor having a program memory containing the read-only memory;

wherein when during processing there occurs a case distinction by ranges for the input values and the values within the ranges are processed by programming parts lasting various lengths of time, the classification unit determines a frequency of occurrence of the ranges of the input values and reprograms the read-only memory such that a sequence of case distinctions is carried out in accordance with the frequency of the occurrence of associated ranges, a case distinction belonging to a range having the greatest frequency taking place first.

2. The circuit as claimed in claim 1, wherein the processing unit with the electrically erasable and electrically programmable read-only memory, the classification unit and the interface unit are monolithically integrated on a semiconductor chip.

* * * * *